April 30, 1940.   L. M. SHELDON ET AL   2,198,706

REFINING WOOD PULP

Filed Nov. 23, 1936

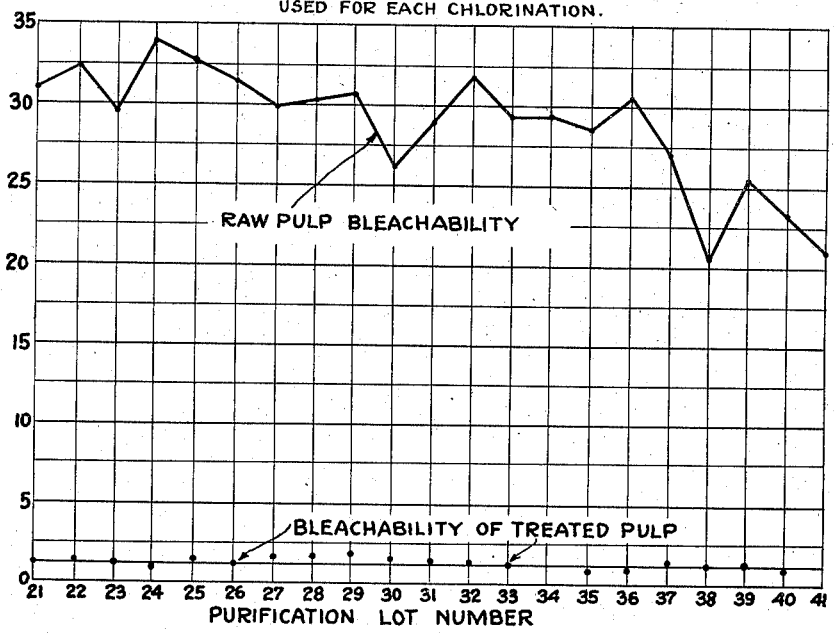

FIG. 1. RESULTS OF PLANT SCALE CHLORINATIONS
RAW PULP = KEMI 3 STAR (SPRUCE)
CHLORINE = TO 16.1% OF RAW PULP BLEACHABILITY USED FOR EACH CHLORINATION.

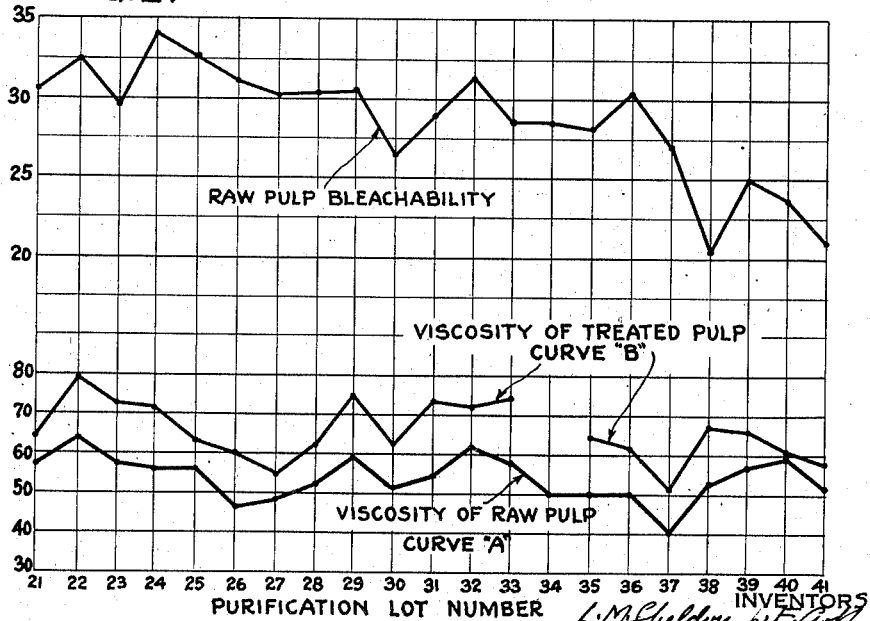

FIG. 2.

RESULTS OF PLANT SCALE CHLORINATIONS
RAW PULP = KEMI 3 STAR SPRUCE
CHLORINE = 16.1% OF RAW PULP BLEACHABILITY USED FOR EACH CHLORINATION

INVENTORS
L. M. Sheldon, L. E. Goff,
D. R. Alderson & J. R. Fisher
BY
Edwards, Bower & Wood
ATTORNEYS Patented Apr. 30, 1940

2,198,706

UNITED STATES PATENT OFFICE 2,198,706

REFINING WOOD PULP

Lyle M. Sheldon, East Alton, and Lionel E. Goff and Dwight A. Alderson, Alton, Ill., and George N. Fisher, St. Louis, Mo., assignors to The Cellulose Research Corporation, East Alton, Ill., a corporation of Delaware Application November 23, 1936, Serial No. 112,304

4 Claims. (Cl. 8—105)

This invention relates to the production of wood cellulose suitable for conversion into derivatives, and more particularly into cellulose acetate.

A primary object of the invention is to provide a step in the process of purifying sulfite wood cellulose to a quality capable of conversion into esters, ethers and other derivatives, and more especially into cellulose acetate, which comprises chlorinating and thereafter causticizing unbleached sulfite pulps of diverse bleachabilities in such a manner as to reduce the bleach values to a uniform level, substantially invariable between successive batches.

Another object is to provide, as the first step in the process of purifying unbleached sulfite wood cellulose to a quality suitable for esterification, a treatment which comprises removing substantially all of the ligneous materials without effecting any substantial degradation of the cellulose.

A further object is to provide a process for treating sulfite wood celluloses of diverse bleachabilities within the range of 5%–50% whereby the pulps are rendered substantially lignin free and their contents of residual oxidizable material reduced to a nearly invariable value.

Still another object of the invention is to provide a process for producing a highly porous, reactive sulfite wood cellulose, characterized by the uniformity of its physical properties between successive batches.

Another object of the invention is to provide a sulfite wood cellulose by an exceptionally economical process with a yield of the order of 42%–44% by weight of the wood (oven dry basis), characterized by the nearly invariable uniformity of its bleach value and physical properties between successive batches and having an alpha content in excess of 90%.

Another object is to provide a step in the process of purifying sulfite wood cellulose to a quality suitable for esterification and the production of other derivatives which comprises chlorinating and causticizing unbleached sulfite pulps of diverse bleachabilities in the range of 5%–50% to remove impurities and reduce their bleachabilities to a predetermined, nearly invariable level without effecting any substantial depolymerization of the cellulose fibers.

Other objects will be obvious.

In the accompanying drawing which illustrates certain features of the invention:

Figure 1 illustrates the bleach characteristics of a number of typical successive batches of sulfite pulp before and after treatment by the process of this invention.

Figure 2 illustrates the effect of the chlorinating and causticizing practice of this invention on the viscosity characteristics of a series of typical sulfite wood pulps.

The primary requirements of cellulose for use in the manufacture of cellulose esters, ethers, regenerated cellulose and other derivatives are a uniformity of the chemical and physical properties of the cellulose between successive batches or lots and a generally high degree of chemical purity. While some cellulose derivatives, such as viscose rayon and Cellophane, do not necessarily demand an extremely high state of chemical purity of the base cellulosic material such as, for example, cellulose acetate and certain cellulose ethers, the uniformity of the cellulose product between successive lots or shipments is in most cases a nearly indispensable requirement.

Cotton linters are the purest natural form in which cellulose occurs in substantial quantities. This raw material responds readily to refinement to a very high alpha cellulose content and, as a consequence, has long been regarded as a standard of chemical cellulose quality. Nevertheless, purified cotton linters have always been deficient with respect to uniformity of some of their chemical and physical properties. The cause of these variations has been traced to such diverse factors as the influence of season or climatic conditions on the growth of the cotton plant, the geographical region in which the cotton is grown, and even to variations of soil in the same regions, as well as other growth conditions. Although much effort has been expended in attempts to reduce these variations, there is a continued existence of variability. This is evidenced by the fact that many manufacturers of cellulose derivatives, particularly cellulose acetate, endeavor to secure their supplies of cotton linters derived from cotton grown in certain definite geographical areas which experience has shown tend to produce less variable material.

These variations are highly magnified in the case of wood cellulose. This is due not only to the relatively great chemical and physical differences between coniferous and deciduous woods but also to the differences found in a single wood species of either group arising from variations in the age of the trees, the geographical regions of growth, and even to variations in different sections of the same tree. In order to obtain a uniformly duplicable purified derivative cellulose, such variations in the wood demand a specially designed treatment that will level out these variations with an accuracy that has never before been practiced.

The digestion treatment to which the wood is subjected is capable of being conducted and controlled to produce unbleached pulps in which the inherent variabilities in the wood referred to are in part reduced. The present invention, however, relates to the first step in the purification of sulfite digested pulps. The prior practices in purifying sulfite wood pulp for paper and derivative purposes contain many examples of treating wood pulp with chlorine water or chlorine gas and following this with an alkaline treatment. For instance, in making paper pulp the acids formed by the chlorination are usually neutralized with alkali, and in making derivative pulp an alkaline treatment at elevated temperature frequently follows the chlorination.

The process of the present invention likewise comprises chlorination and the removal of the chlorinated compounds by an alkaline treatment. However, the results are in sharp contrast to those of the prior practices. We specifically control our process in such a manner that regardless of the conditions of digestion or the nature of the wood employed, a pulp is produced with a nearly invariable content of oxidizable material and the bleach value is reduced to a nearly invariable level of the order of 1.5%.

The invention comprises a process for treating sulfite digested wood pulps of diverse bleachabilities with chlorine under conditions which insure the complete chlorination of all of the ligneous material immediately reactive with chlorine and avoid any substantial oxidation of the cellulose. The products of chlorination are removed by an alkaline treatment and the treated pulp is then washed with water until neutral. The process is carried out in such a manner that the oxidizable, non-cellulosic material present in the original pulp is reduced to a substantially invariable, small residual amount between successive batches, regardless of the bleachabilities of the raw pulp within the range of 5%–50%.

One of the important features of the present invention is the method of chlorinating the raw pulp and removing the chlorinated compounds. This step in the purification process yields valuable results by leveling the variable bleach values inherent in the raw pulp between successive batches and by reducing the oxidizable material present to a uniform amount so small as to render it removable by the use of less than 1% bleach powder (based on the oven dry weight of the pulp). This condition of the pulp is highly favorable for further purification to an end product characterized by the uniformity of the chemical and physical properties thereof and the uniformity of the distribution of any residual impurities it may contain, regardless of the extent to which the subsequent purification is carried. It permits, for example, the refinement of celluloses to a relatively impure standard, yet readily capable of conversion into acetate characterized by the uniformity of its various physical and chemical properties from batch to batch.

By effecting a leveling of the bleach values of raw pulps of diverse bleachabilities at the very beginning of the purification cycle, the subsequent treatment of the chlorinated pulps is capable of being simplified and standardized. Furthermore, the subsequent refining steps may be much more lenient and thus result in substantially no degradation of the cellulose fibers themselves and, regardless of the purity imparted to the end product, in higher yields of purified cellulose than has heretofore been obtainable by prior practices.

These results are accomplished by treating the unbleached sulfite wood cellulose with an amount of chlorine gas in pounds per 100 pounds of pulp (oven dry basis) limited to approximately 14%–18% of the bleach value of the raw pulp. We have found that this quantity of chlorine gas is just the amount sufficient to react with and render soluble all of the ligneous material immediately responsive to chlorine, for example, in less than 20 minutes. A quantity in excess of this amount is wasteful since it effects substantially no further removal of the ligneous or other impurities. Furthermore, if allowed to remain in contact with the pulp for more than the order of 30 minutes, it will effect undesirable oxidation of the cellulose. A smaller amount will be insufficient to react with all of the ligneous material immediately responsive to chlorine. This method of calculating the amount of chlorine to be added is applicable to any raw sulfite pulp having a bleachability within the range of 5%–50%.

In carrying out the treatment, the pulp is made into a thin water slurry and completely defibered so that there are substantially no fiber bundles or mats of fibers remaining in the slurry and each fiber is separated from its neighbor. Thus, a maximum surface area of ligneous material is exposed and readily accessible to the reagent.

The chlorination may be carried out by either a batch or continuous system. Where the batch system is used, the chlorine gas is added at a uniform rate during continuous and energetic agitation of the pulp in such a manner that each part of the pulp receives its quota of chlorine. As substantially no chlorine in excess of the amount that will immediately react with the ligneous material in 20 minutes or less is used, no part of the pulp is over-chlorinated. In other words, the operation is carried out in such a manner as to insure uniform and complete reaction with respect to the ligneous and other impurities associated with every cellulose fiber comprising the mass of pulp under treatment.

Where the operation is carried out as a continuous process, the chlorine gas is added to the pulp slurry in a suitable mixing device from which the slurry passes in a continuous stream at a regulated rate to a chlorination chamber. The rate of flow of the continuous stream of pulp through the chlorination chamber is so regulated that the time of passage through the chamber of each part of pulp is a nearly invariable one of the order of 10 minutes or less. Thus, upon emerging from the chlorination chamber all of the chlorine gas will have been exhausted by reaction with the ligneous material.

The total amount of gas is added to the pulp slurry as rapidly as possible, consistent with the attainment of the above mentioned objective of uniformity of treatment. Usually the requisite amount of reagent can be added in from 5 to 20 minutes. During the treatment the temperature of the mass is preferably controlled to the order of 23°–25° C.

The chlorinated compounds are removed from the pulp by treatment with alkali, preferably sodium hydroxide. The temperature and concentration of the alkali solution may be varied considerably. A desirable treatment is to add a sufficient amount of sodium hydroxide to the pulp slurry at the termination of the chlorination period to give the slurry a pH greater than 9.0. The alkali is preferably added at a temperature of 50° C. or higher. Care is exercised that the pulp does not come in contact with caustic solutions of greater than 7% concentration as higher concentrations contacting the chlorinated pulp, even momentarily, have a tendency to "set" the residual coloring matter remaining in the cellulose fibers, rendering it more difficult to remove in the subsequent treatments.

The temperature of the alkaline mass is raised to greater than 70° C. as rapidly as the existing facilities will permit and held above 70° C. for about 30–60 minutes. The heating is discontinued and the pulp then drained free of the alkaline solution, thoroughly washed with water, and the pH adjusted until it falls to approximately 7.0.

The result of the foregoing treatment is to reduce the bleach value of the pulp to the order of 1.5%, irrespective of the initial bleachability of the raw pulp before chlorination within the range of 5%–50%. At the same time the oxidizable residual coloring material is reduced to a substantially uniform value and may be removed by a subsequently applied hypochlorite bleach employing less than 1% bleaching powder (based on the oven dry weight of the pulp). Figure 1 illustrates the leveling effect on the bleach values of a series of raw pulps having initial bleachabilities ranging from about 20% to 35% when subjected to a chlorination and causticizing treatment as described. It will be readily seen that regardless of the initial bleachability, the result of this treatment in the typical series exemplified in the graphs of Figure 1 is to reduce the bleach value to about 1.5% within a plus or minus tolerance of the order of less than 0.5%.

Another result of the process of the present invention is to increase the alpha cellulose content of the treated pulp to above 90% and reduce the soda soluble content to less than about 15%, irrespective of the bleachability of the original pulp within the range of 5%–50%.

The leveling effect of the controlled chlorination and causticizing treatment on the properties of the pulp is considered to be of fundamental importance to the success of the subsequent refining steps of the process in producing wood cellulose of controlled uniformity for derivative purposes. It is also regarded as a critical step in the purification process for the production of cellulose intended for conversion into cellulose acetate.

In addition to standardizing the bleach value which the treatment effects to successive batches or lots of pulps, the porosity of the cellulose fibers is likewise brought to a high degree of uniformity as a result of the treatment. The residual impurities remaining in the pulp are quite uniformly distributed with respect to the individual fibers. These impurities are thus uniformly accessible to subsequently added treating reagents. As a consequence, the further refinement of the pulp is capable of control to a standardized, lenient processing cycle, regardless of the degree of purity which the subsequent treatment is designed to impart to the product.

Another important feature of the present invention is the substantially complete avoidance of chemical degradation of the cellulose fibers by the chlorination and causticizing treatment. This feature is illustrated by reference to Figure 2 in which curve A shows the cuprammonium viscosities of a typical series of raw sulfite wood pulps and curve B shows the solution viscosities of the same series after the chlorination and causticizing treatment of the present invention. It will be noted that curve B closely follows the pattern of curve A, i. e., the viscosity of the chlorinated and causticized pulp is approximately directly proportional to the viscosity of the raw pulp. The viscosity of the treated pulp (it will be seen) is from 2 to 15 centipoises higher than the untreated material. The increase in the cuprammonium viscosity of the treated pulp is explained as due to the removal of ligneous and other impurities from the pulp.

In addition to the foregoing, the controlled chlorination and causticizing treatment renders the pulp substantially lignin free and reduces the coloring material to such an extent that it is capable of removal by a very light hypochlorite bleach, for example, ¼%–½% bleaching powder. These results are likewise obtained irrespective of the initial bleachability of the raw pulp within the range of 5%–50%.

A result of the invention is the attainment of yields of pulps of the order of 42%–44% of the weight of the original wood (oven dry basis), having an alpha content in excess of 90% and a soda soluble content of less than 15%.

The invention may be applied to sulfite pulps derived from coniferous woods, such as spruce and southern pine, and from deciduous woods, such as black gum and yellow birch, with equally satisfactory results.

In order more particularly to describe the present invention, typical embodiments thereof are set forth in the following examples, A and B. It will be understood that the various features set forth in connection with the embodiments in the examples are by way of illustration only and may be considerably varied within the scope of the present invention. Definitions of beachability and other terms used herein will be found at the end of the specification.

Example A

Wood pulp of high bleachability, prepared by a sulfite digestion of black gum and having an analysis as follows is used:

Alpha cellulose _____ percent __ 86.9
Soda solubility _____ do ____ 24.9
Viscosity _____ ctps __ 26.6
Bleachability _____ percent __ 45.8

The pulp is completely defibered and made into a uniform water slurry of 3% consistency; the temperature preferably controlled at about 25° C. All bundles and mats of fibers are broken up by vigorous agitation in a suitable vessel so that each fiber is separated from its neighbor. In some cases, especially where the bleachability of the pulp is very high, violent agitation of the pulp slurry may fail to resolve all of the bundles and mats of fibers. These may be removed by screening in a packer screen or other suitable device.

The pulp slurry is placed in vigorous agitation and 7.3 pounds of chlorine gas is admitted at the bottom of the tank containing the slurry for each 100 pounds of oven dry cellulose (calculated at 16% of 45.8). The chlorine gas is admitted as rapidly as possible without having bubbles of the gas rising to the surface of the pulp slurry. This rapid addition of chlorine to the vigorously agitating slurry results in each portion of the unchlorinated pulp receiving just its quota of chlorine gas and insures a very uniform, rapid reaction with the ligneous portion of the pulp.

The available chlorine is exhausted usually in less than 10 minutes after the addition of the reagent is completed. In some cases it is desirable to continue agitation of the slurry for 30–45 minutes after the exhaustion of the chlorine. This permits the removal from the cellulose of any mineral matter present which is soluble in the hydrochloric acid formed during the reaction.

Sodium hydroxide solution of about 5% concentration is then incorporated with the pulp slurry until the equilibrium caustic concentration is about 1%. This will reduce the pulp consistency from 3% to about 2½%. The temperature of the mass is then raised to 100° C. as rapidly as the heating facilities will permit and is held at 100° C. for approximately 30 minutes. The pulp is thereafter separated from the liquid in any convenient manner, such as by draining, centrifuging or filtering, and is then washed with water until neutral. The drained caustic solution is transferred to suitable storage for use in subsequent operations.

The pulp is now in an ideal condition for further purification to cellulose suitable for derivative purposes and has an analysis as follows:

| | | |
|---|---|---|
| Alpha cellulose | percent | 92.5 |
| Soda solubility | do | 11.7 |
| Viscosity | ctps | 39.01 |
| Bleachability | percent | 1.7 |

The yield of pulp, based on the original weight of wood (oven dry basis), is of the order of 44%.

Example B

Similarly completely defibered black gum sulfite pulp of low bleachability having an analysis of

| | | |
|---|---|---|
| Alpha cellulose | percent | 88.8 |
| Soda solubility | do | 26.1 |
| Viscosity | ctps | 18 |
| Bleachability | percent | 14.5 | is made into a uniform slurry of 3% consistency at about 25° C.

The slurry is agitated vigorously and 2.3 pounds of chlorine is admitted at the bottom of the tank containing the slurry for each 100 pounds of oven dry cellulose (calculated as 16% of 14.5). The chlorine is added rapidly to the agitating slurry. After exhaustion of the chlorine, the pulp is given an alkaline treatment and thereafter washed to neutrality, all as described in Example A.

The treated pulp then has properties similar to those of the pulp resulting from Example A, namely:

| | | |
|---|---|---|
| Alpha cellulose | percent | 94.1 |
| Soda solubility | do | 14.8 |
| Viscosity | ctps | 20.4 |
| Bleachability | percent | 1.7 |

The material is in very suitable form for further purification into derivative pulp. The yield of pulp, based on the original weight of wood (oven dry basis), is of the order of 42%.

Many variabilities are encountered in the ordinary course of digesting wood chips which in the aggregate result in corresponding variabilities in the properties of the pulps between successive digester charges. These variations exist (a) in the general quality of the wood, (b) in the difference in the structure between coniferous and deciduous woods and in different species of coniferous and deciduous varieties, (c) in the proportions of sapwood and heartwood in each digester charge, (d) in the moisture content of the chips between successive batches, and (e) even in the moisture content of chips in the same digester charge. Lack of proper and uniform impregnation results in a non-uniformity of digestion between the exterior and interior portions of each chip. Variability in the composition of the treating solutions during digestion is caused by the customary digester relief practice. The cumulative effect of these variable factors usually results in considerable variation in the average quality of the pulp between successive digester charges. Further effects are chemical degradation and a general lack of uniformity of the extent of treatment to which chips in different portions of the digester are treated, and particularly to the characteristic over-treatment of the fibers comprising the outermost portions of each chip and the under-treatment of fibers residing at or near the centers of the chips.

The usual purification methods, when applied to such pulps, invariably result in an inhomogeneous purified product. Regardless of the care which is exercised to attain a uniformity of the properties of the purified pulp between successive batches, the inherent irregularities in the raw pulp persist and are frequently accentuated in the end product. Such irregularities are particularly objectionable in cellulose intended for acetylation. They are reflected in a lack of uniform response of the individual fibers comprising the pulp to the action of the acetylating reagents and the presence of a prohibitive amount of unacetylated particles, fibers, and haze and color producing bodies in the acetate.

The effectiveness of the method of the present invention for leveling out inequalities in unbleached pulps is such that many raw wood pulps produced by prior processes may be successfully refined by the method of the present invention to superior products for conversion into derivatives and even into cellulose acetate.

Another important result of the present invention is the facility and uniformity with which the residual impurities may be removed by subsequent treatment when the variability of the properties of the raw pulp are reduced or eliminated at the very beginning of the refinement process by the practice of the present invention. Such impurities as may remain in the pulp are uniformly distributed with respect to the individual fibers. As a consequence, they respond to far milder treatments thereafter, so that the desired properties of the cellulose are preserved and no substantial chemical degradation occurs. The resulting purified pulp is distinguished by a very high retention of those inherent properties in the native cellulose fibers which result in derivatives of superior characteristics.

A still further important result of the present invention is the very high yield of product possessing the favorable and uniform properties described. Owing to the nearly complete elimination of chemical degradation during the processing, substantially all of the native alpha cellulose component of the wood is retained in the purified cellulose. Yields of the order of 41%–43% or more of pulp, based on the original weight of wood (oven dry basis) from deciduous woods such as gum, birch and maple, and of the order of 42%–44% or more from coniferous woods such as spruce, southern pines and western hemlock, are readily attained by the practice described in any of the examples set forth herein.

In the foregoing specification and following claims, terms have been used having the following meanings:

*Chemical degradation.*—By this expression we mean the result of chemical action, especially in an oxidizable medium, whereby the cellulose molecule is attacked and converted into a different compound. It is probable that this attack first occurs at an oxygen bridge and that oxidation to an aldehyde or an acid occurs. This action is to be distinguished from hydrolytic scission of the long chains in which water enters the molecule to give two hydroxyl groups at the adjoining ends of the severed chain.

*Alpha cellulose* is defined as that portion of a sample of cellulosic material not dissolved by 17.5% sodium hydroxide solution at 20° C. determined by a refinement of the method described by H. F. Lewis in "Technical Association Papers", series XVII, #1, 436 (1934).

*Soda soluble material* is defined as that portion of a cellulosic sample dissolved when it is subjected to the action of 7.14% sodium hydroxide solution at the boiling point of water for 3 hours by a refinement of the method of Griffin, "Technical Methods of Analysis", page 492 (1927 Ed.).

*Bleachability of cellulose*, as used herein, is a measure of the materials oxidizable by potassium permanganate in the presence of an acid, and is expressed in terms of standard bleaching powder containing 35% available chlorine. The determination consists of treating a 1 gram sample of material completely dispersed in 750 cc. of a solution composed of 0.133 N sulfuric acid and N/300 potassium permanganate with potassium iodide, and back titrating with sodium thiosulfate. A detailed description of the method, including the conversion table for expressing the permanganate number in terms of bleaching powder of 35% available chlorine, was published by T. A. P. P. I., series XVII, #1, 146 (1934), "Permanganate Number of Pulp" by R. N. Wiles.

*Porosity*, as used herein, is defined as the absorptive power of a substance, particularly the fibers with which the present invention is concerned. By fibers of high porosity, as used in this specification, is meant a swollen skeletal fiber structure comprising a network of capillary channels substantially cleared of amorphous and other non-cellulosic material. The network of capillary vessels of such swollen fibers serve to distribute liquid throughout the cell walls of every fiber. Such liquids provide a diffusion medium by means of which the desired reagents are able to promptly reach every part of the fiber. These liquids may be the actual treating solutions themselves. In addition to the network of channels mentioned above, the cell wall substance should be in a substantially completely swollen condition in order to assist, by diffusion through the swollen cell walls, the work of the capillaries in the distribution of liquid uniformly throughout the fibers. Fibers are considered to be less porous when the amorphous and other non-cellulosic material has been insufficiently removed to provide a network of substantially unobstructed capillary passages, or the fiber structure is insufficiently swollen, or both. Porous fibers will absorb more liquid than impermeable fibers.

As many changes could be made in carrying out the above compositions and processes without departing from the scope of the invention, it is intended that all matter contained in the above description or shown in the accompanying drawing shall be interpreted as illustrative and not in a limiting sense.

We claim:

1. In the purification of sulphite wood cellulose to a quality capable of conversion into esters, the process comprising providing a number of unbleached sulphite pulps of diverse bleachabilities between 5 and 50%, defibering each of said pulps so that substantially no fiber bundles or mats remain, agitating said pulps in water slurries and introducing chlorine into each of said slurries in amount equivalent to 14 to 18% of the bleach value of the corresponding pulp, continuing the treatment of each of said slurries at least to exhaustion of the chlorine in each respective slurry, subjecting each chlorinated pulp to the action of an alkaline solution having a pH greater than 9 and a concentration of alkaline reagent of less than 7% and continuing said alkaline treatments of said pulps for 30–60 minutes at a temperature greater than 70° C., whereby the chlorinated compounds in the pulps are dissolved and the bleach values of the pulps are reduced to a substantially uniform level which is below 5%.

2. A process as set forth in claim 1 in which the respective pulps are subjected to the action of any hydrochloric acid resulting from the chlorination treatment by continuing the treatments after the introduction of the chlorine for about thirty to forty-five minutes after the exhaustion of the introduced chlorine.

3. A process as set forth in claim 1 in which the alkali is introduced directly into the slurry of pulp and chlorine water after exhaustion of the chlorine.

4. A process as set forth in claim 1 in which the alkaline solution consists of boiling caustic soda of about 1% concentration.

LYLE M. SHELDON.
LIONEL E. GOFF.
DWIGHT A. ALDERSON.
GEORGE N. FISHER.